(12) United States Patent
Khizroev et al.

(10) Patent No.: US 6,865,057 B2
(45) Date of Patent: Mar. 8, 2005

(54) GAPLESS LONGITUDINAL MAGNETIC RECORDING HEAD WITH FLUX CAVITY

(75) Inventors: Sakhrat Khizroev, Pittsburgh, PA (US); Dmitri Litvinov, Pittsburgh, PA (US); Earl Chrzaszcz Johns, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/755,730

(22) Filed: Jan. 5, 2001

(65) Prior Publication Data

US 2001/0024341 A1 Sep. 27, 2001
US 2004/0240107 A9 Sep. 27, 2001

Related U.S. Application Data

(60) Provisional application No. 60/175,793, filed on Jan. 12, 2000, and provisional application No. 60/174,524, filed on Jan. 5, 2000.

(51) Int. Cl.⁷ .......................... G11B 5/127; G11B 5/147; G11B 5/10
(52) U.S. Cl. .......................... 360/125; 360/126; 360/128
(58) Field of Search .................. 360/122, 126, 360/125, 124; G11B 5/23, 5/25, 5/22, 5/42

(56) References Cited

U.S. PATENT DOCUMENTS

| | | | | |
|---|---|---|---|---|
| 3,201,731 A | * | 8/1965 | Baenziger et al. | 29/609 |
| 3,314,056 A | * | 4/1967 | Lawrence | 360/119 |
| 3,686,467 A | * | 8/1972 | Camras | 360/110 |
| 3,686,468 A | * | 8/1972 | Garnier, Jr. | 360/127 |
| 3,694,784 A | * | 9/1972 | Meili | 336/134 |
| 5,016,342 A | * | 5/1991 | Pisharody et al. | 360/121 |
| 5,063,467 A | * | 11/1991 | Colineau et al. | 360/126 |
| 5,434,733 A | * | 7/1995 | Hesterman et al. | 360/121 |

FOREIGN PATENT DOCUMENTS

GB    1251372    * 11/1971    ............ G11B/5/20

OTHER PUBLICATIONS

IBM Technical Disclosure Bulletin, "Gapless Read Head Structure". Jan. 1971. vol. No. 13. Issue No. 8. p. No. 2374.*

* cited by examiner

Primary Examiner—A. J. Heinz
Assistant Examiner—C R Magee
(74) Attorney, Agent, or Firm—Alan G. Towner, Esq.; Pietragallo, Bosick & Gordon

(57) ABSTRACT

A longitudinal recording head for use with magnetic recording media includes a gapless yoke with a cavity that expels magnetic flux onto a small area of the magnetic recording medium. Longitudinal recording heads incorporating the gapless yoke and flux cavity are capable of improved recording densities.

15 Claims, 7 Drawing Sheets

GAPLESS LONGITUDINAL MAGNETIC RECORDING HEAD WITH FLUX CAVITY

CROSS REFERENCE TO RELATED APPLICATION

This application claims the benefit of U.S. Provisional Patent Application Ser. No. 60/174,524 filed Jan. 5, 2000, and also claims the benefit of U.S. Provisional Patent Application Ser. No. 60/175,793 filed Jan. 12, 2000. This application is a continuation-in-part of the National Phase of International Application Ser. No. PCT/US00/27356, filed Oct. 4, 2000.

FIELD OF THE INVENTION

This invention relates to magnetic recording heads, and more particularly, relates to gapless longitudinal recording heads for recording at high densities.

BACKGROUND INFORMATION

Magnetic hard disk drives incorporating longitudinal recording heads are well known. However, conventional longitudinal recording heads suffer from the disadvantage that at high recording densities, e.g., exceeding 40 Gbit/in$^2$, the track width is relatively large. In particular, a track width cannot be defined which is smaller than the head track width plus two times the gap length of the head in conventional designs. This limitation results from side fringing magnetic fields which spread at a distance on the order of the gap length from the both track sides across the track. Decreasing the gap length should reduce this characteristic side fringing region. However, as the gap length is decreased, the magnetic fields in the region of recording media along the track are also reduced. For example, at a 50 nm gap length, the maximum in-plane field component at a 10 nm flying height is less than 10,000 Oe, assuming a high moment (4 Ms~20 kG) pole tip material is used. This field is not sufficient to record transitions clear enough for such high densities. At such high densities recording media are expected to have dynamic coercivity above 5,000 Oe, and approximately two times the coercivity is required to record sufficiently defined transitions. Therefore, there is a trade-off in decreasing the gap length.

U.S. Pat. No. 5,621,595 to Cohen discloses a magnetic recording head with a pinched gap which is said to reduce side fringing magnetic fields in the gap region. While the disclosed pinched gap design may reduce side fringing fields, the fields in the track region are also reduced significantly, resulting in the inability to record on high coercivity media. Furthermore, the pinched gap design is extremely sensitive to write currents.

The present invention has been developed in view of the foregoing, and to address other deficiencies of the prior art.

SUMMARY OF THE INVENTION

The present invention provides a longitudinal magnetic recording head with a gapless yoke having a flux cavity. The cavity acts to expel magnetic flux from the yoke in a manner which concentrates the magnetic flux in the region below the cavity. Strong localized magnetic fields are thereby generated in the magnetic recording region under the flux cavity. The use of the present gapless yoke and flux cavity significantly increases the data storage densities while avoiding the necessity of making substantial modifications to conventional longitudinal recording head designs.

An aspect of the present invention is to provide a longitudinal recording head for use with a magnetic recording medium. The longitudinal recording head includes a gapless magnetic recording yoke and a flux cavity in the yoke.

Another aspect of the present invention is to provide a method of making a flux cavity in a yoke of a longitudinal recording head for use with a magnetic recording medium. The method includes the steps of providing a magnetic recording yoke, and creating a flux cavity in the yoke.

These and other aspects of the present invention will be more apparent from the following description.

DETAILED DESCRIPTION

Figure 1:
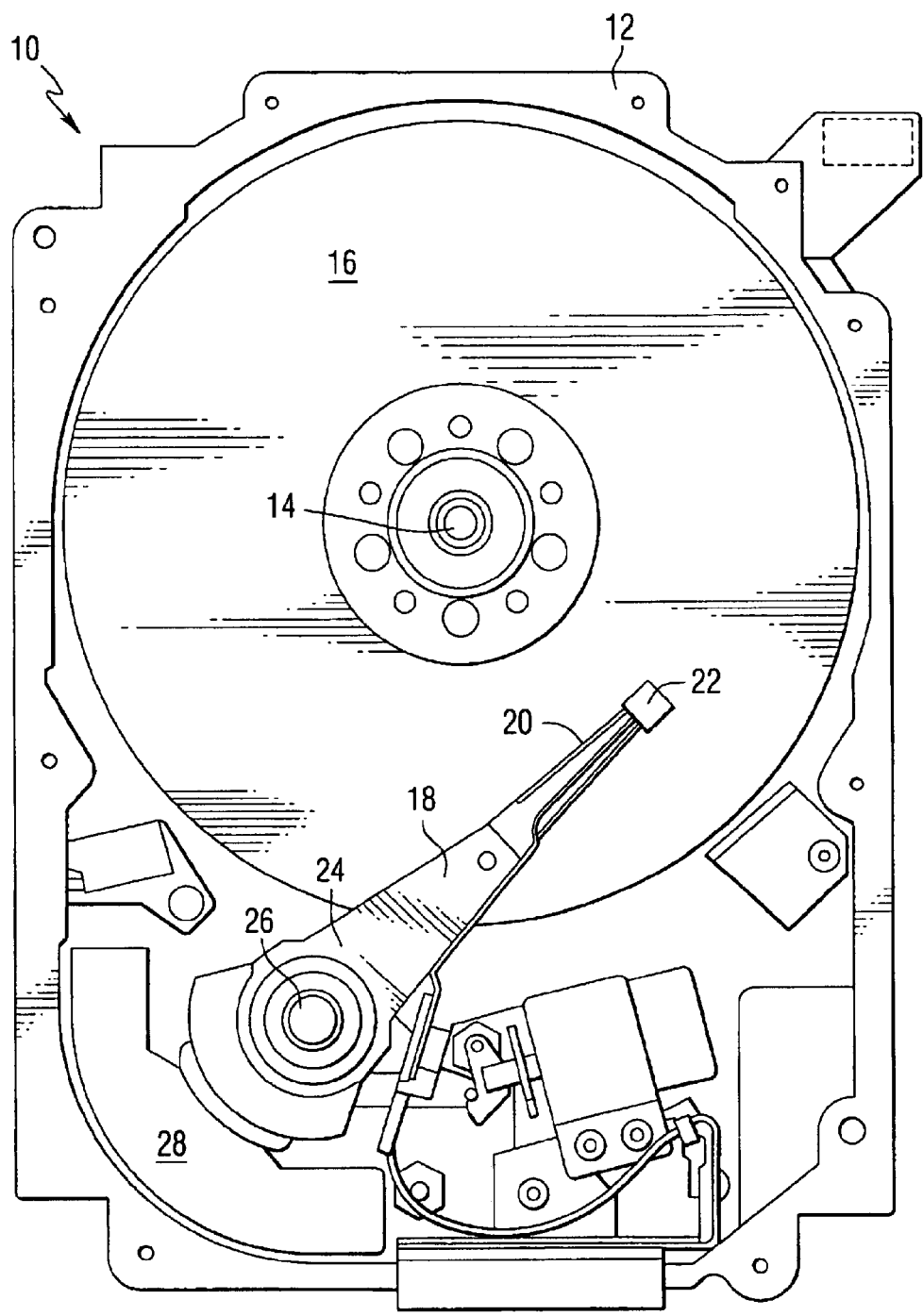
FIG. 1 is a top view of a typical computer hard disk drive for which the present invention may be used, illustrating the disk drive with its upper housing portion removed.

The invention is described in relation to presently known longitudinal recording heads used with a hard disk drive 10 for computers, one of which is illustrated in FIG. 1. As used herein, "recording head" means a head adapted for read and/or write operations. The hard disk drive 10 includes a housing 12 (with the upper portion removed and the lower portion visible in this view for maximum clarity) dimensioned and configured to contain and locate the various components of the disk drive 10. The disk drive 10 includes a spindle motor 14 for rotating at least one magnetic storage medium 16 within the housing, in this case a magnetic disk. At least one arm 18 is contained within the housing 12, with each arm 18 having a first end 20 with a longitudinal recording head 22, and a second end 24 pivotally mounted to a bearing 26. An actuator motor 28, such as a movable coil DC motor, is located at the arm's second end 24, pivoting the arm 18 to position the head 22 over a desired sector of the disk 16. The actuator motor 28 is regulated by a controller which is not shown, and which is well known.

Writing is accomplished by rotating the disk 16 relative to recording head 22 so that the recording head 22 is located above the appropriate sectors of tracks on the disk 16. Reading from the disk 16 may be accomplished either using the same head 22, or with a separate read head adjacent to the write head 22. If the individual magnetic fields are too close to each other within the magnetic layer of the disk 16, writing to the magnetic storage medium will affect not only the desired location on the disk, but also neighboring locations. Therefore, maximizing flux density within a desired section of a track while minimizing flux density within neighboring sections, permits the tracks to be smaller, thereby permitting a greater number of tracks within a disk, and allowing the disk to store additional information. Additionally, concentrating the flux density within only the track directly below the recording head 22 will permit the same flux density within the track to be achieved by a lower power level. Alternatively, concentrating the magnetic flux will increase flux density at the same power level, thereby permitting a track to be magnetically harder (have a higher coercivity) at the same power level.

Figure 2A:
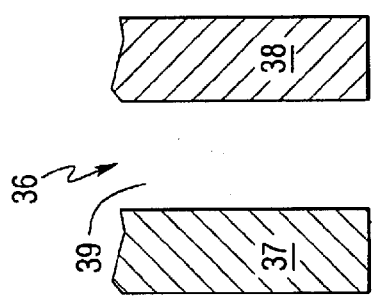
FIGS. 2a and 2b are partially schematic side and bottom views, respectively, of poles of a conventional longitudinal recording head having a uniform gap.
Figure 2B:
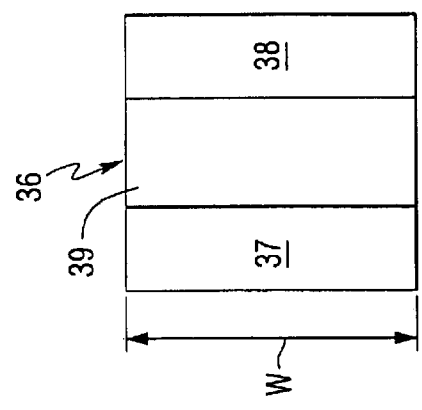

In accordance with the present invention, a longitudinal recording head may be modified by eliminating the gap between the leading and trailing poles of the writer, and by providing a flux cavity in the gapless yoke. By varying the flux cavity geometry in the vertical direction of the yoke (perpendicular to the bottom or air bearing surface) as well as the horizontal direction, the flux pattern can be optimized. It should be noted that in conventional designs, the gap geometry in the vertical direction remains constant from the level of the bottom or air bearing surface to the level of the throat height, as illustrated by the poles of a conventional longitudinal head 36 of FIGS. 2a and 2b. As shown in FIGS. 2a and 2b, the first and second poles 37 and 38 define a uniform gap 39.

Figure 3A:
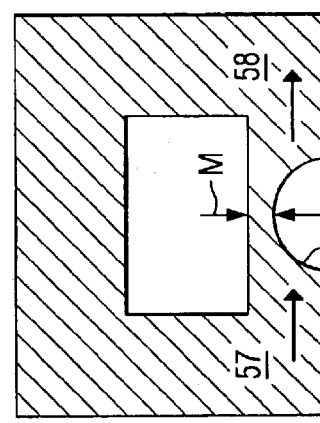
FIGS. 3a and 3b are partially schematic side and bottom views, respectively, of a gapless longitudinal recording yoke having an ellipsoidal flux cavity in accordance with an embodiment of the present invention.
Figure 3B:
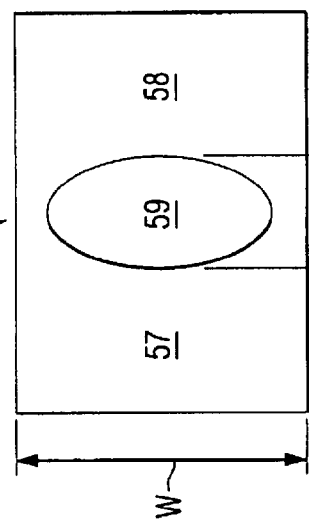

In accordance with an embodiment of the present invention, the magnetic field is controlled by providing a gapless yoke design and controlling the flux cavity shape in the vertical direction, e.g., through the use of a generally ellipsoidal geometry, as shown in FIGS. 3a and 3b. The recording yoke 56 includes first and second portions 57 and 58 made of any suitable magnetically soft material with an ellipsoidal flux cavity 59 therein. The ellipsoidal flux cavity 59 defines a minimum yoke distance M which corresponds to the location of maximum flux concentration below the cavity 59.

Figure 4A:
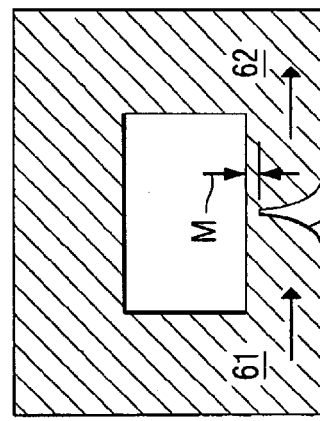
FIGS. 4a and 4b are partially schematic side and bottom views, respectively, of a gapless longitudinal recording yoke having a partially ellipsoidal flux cavity having inwardly curved sidewalls in accordance with another embodiment of the present invention.
Figure 4B:
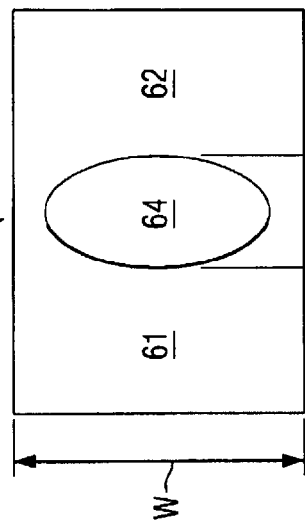

FIGS. 4a and 4b illustrate a recording yoke 60 in accordance with another embodiment of the present invention. The yoke 60 includes first and second portions 61 and 62 made of magnetically soft material with a contoured flux cavity 64 therein. The flux cavity 64 has an elliptical shape at the lower air bearing surface of the yoke 60, with inwardly curved sidewalls which form a narrow hollow tip defining a minimum yoke distance M. The minimum yoke distance M corresponds to the location of maximum flux concentration below the flux cavity 64. The inwardly curved shape of the flux cavity shown in FIGS. 4a and 4b compensates for spacing losses. Another advantage of the inwardly curved walls in the generally ellipsoidal flux cavity as shown in FIGS. 4a and 4b is to increase the magnetic surface charge.

Because the recording yoke has no gap, the present yoke structure can be saturated at a smaller coil current than an equivalent conventional ring yoke with a gap. The smallest cross-sectional area of the yoke M saturates at a smaller current value than the rest of the yoke. A yoke geometry can be chosen such that the narrowest yoke cross-section M is located above the position of the flux cavity. As the current value is increased above the saturation point, the yoke region around the cavity starts to saturate. Before total saturation occurs this region is relatively soft and the magnetic field outside the yoke is perpendicular to the surface of the relatively soft pole material. As this region saturates, the magnetic charge density at the flux cavity surface reaches its maximum. The concave shape of the flux cavity effectively focuses the along-the-track field component in the media region. By adjusting the shape of the cavity, the fields can be concentrated in a small region of a recording medium.

The magnetic fields are determined by the surface charge density in the flux cavity of the yoke. The larger the surface charge is, the larger the field is. In turn, the surface charge is proportional to the value of the discontinuity of the magnetization component normal to the surface. Hence, geometries such as that shown in FIGS. 4a and 4b will promote a larger magnetic charge at the flux cavity because the cavity surface on average is more normal to the flux propagation direction, thus increasing the magnetic charge.

Although generally hemispherical or elliptical flux cavity geometries are primarily described herein, several other cavity geometries may be used in gapless longitudinal recording heads to improve their performance over conventional longitudinal recording heads. Alternative embodiments include cavities having curved or faceted walls of various shapes. For example, the flux cavity may comprise a cylindrical hole having an axis perpendicular to the air bearing surface. Alternatively, the axis of the cylindrical hole may be parallel with the across-the-track direction of the head. The cross-sectional shapes of such cylindrical holes may be circular, ovular, elliptical, triangular, square, rectangular, hexagonal, octagonal, etc. The various flux cavity geometries may be symmetrical or asymmetrical, e.g., one side of the cavity may be semi-circular and the other side may be flat or may have a different shape. The flux cavities may be filled with air, or may comprise other non-magnetic materials. Cavities having contoured sides adapted to concentrate at least a portion of the magnetic flux will be advantageous as compared to conventional uniform gap longitudinal recording heads. This description and accompanying figures therefore provide only representative examples of the many possible cavity geometries, not an inclusive list of all that will work.

Figure 5:
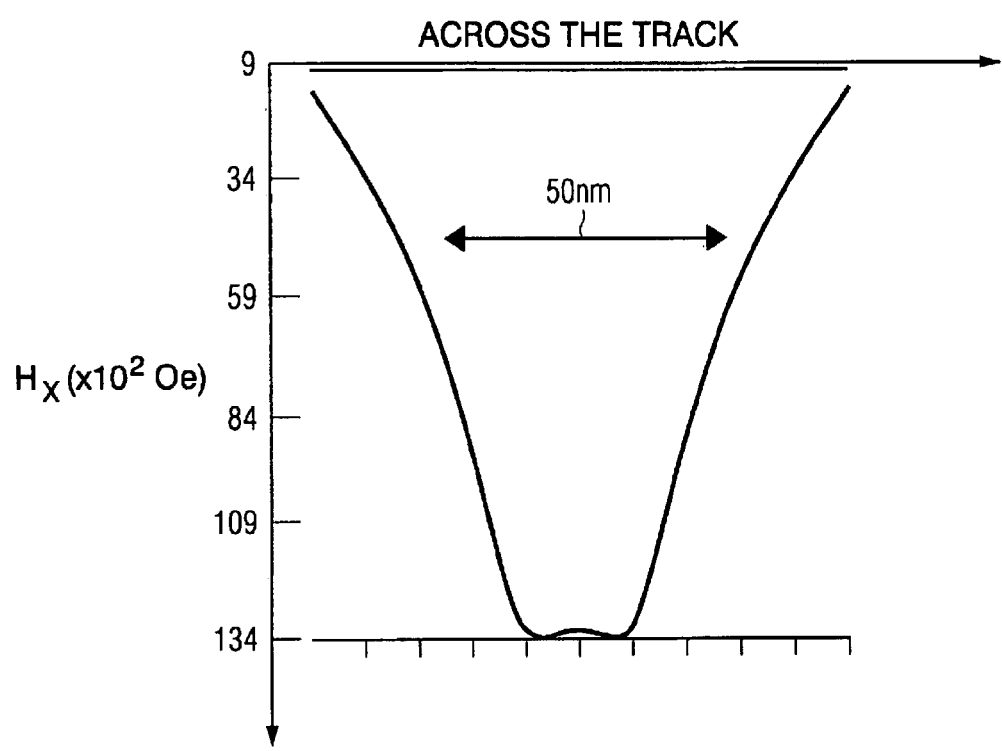
FIG. 5 is a graph of magnetic field strength across the track width for a longitudinal recording head having a gapless yoke and flux cavity in accordance with an embodiment of the present invention.

A modeled along-the-track field component versus the distance across the track for a gapless yoke of the present invention is shown in FIG. 5. The maximum field in a localized region of 60 nm×60 nm at a 10 nm flying height is approximately 13,400 Oe, corresponding to a storage density of more than 200 Gbit/in$^2$.

Figure 6:
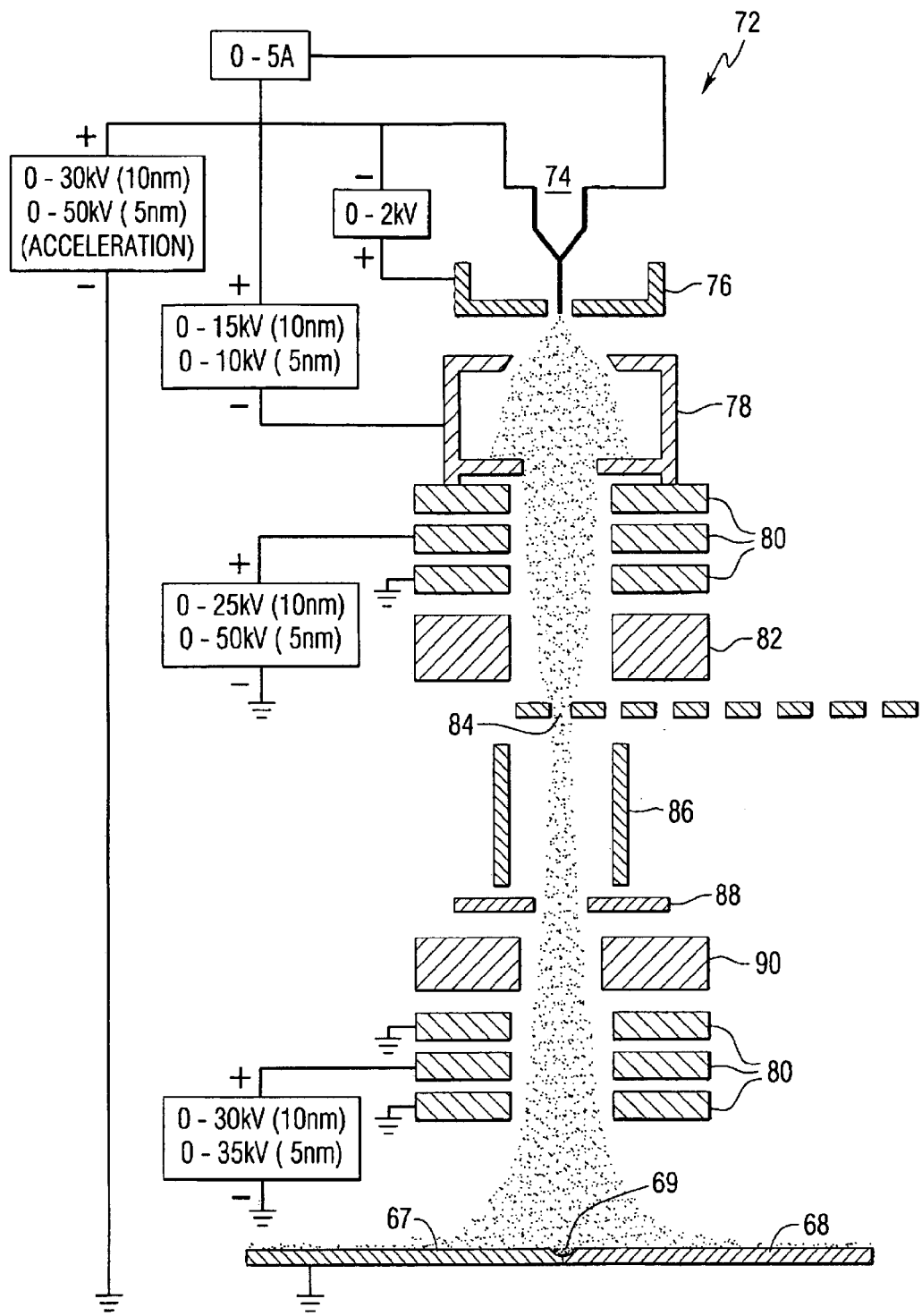
FIG. 6 is a partially schematic side sectional view of a focused ion beam direct etching apparatus which may be used to produce a cavity in the yoke of a gapless longitudinal recording head in accordance with an embodiment of the present invention.

Preferred methods of manufacturing the flux cavities of the present invention include focused ion beam direct etching, electron lithography and optical lithography, as well as mechanical processes such as dimpling the yoke with a stylus made of silicon, silicon nitride, tungsten or the like. An example of a focused ion beam direct etching apparatus 72 is illustrated in FIG. 6. Positively charged ions of liquid metals, for example gallium, are focused onto the bottom surface of the first and second portions 67 and 68 of the yoke to etch the cavity 69. During the process, ions are generated by an ion source 74, passing through a suppressor 76. The ions then proceed through an extractor and spray aperture 78, which begins the focusing process. Next, the ions pass through at least one lens 80, thereby continuing to focus the ions. A stigmator 82 is placed after the first group of lenses 80. The ions then pass through any one of a plurality of limiting apertures 84, which may be selected to further narrow the ion beam. After exiting the aperture 84, the ions pass through a blanking deflector 86, blanking aperture 88 and deflection assembly 90. Lastly, the ions pass through at least one additional lens 80 before striking the bottom surface of the first and second portions 67 and 68 of the yoke to etch the cavity 69.

Figure 7:
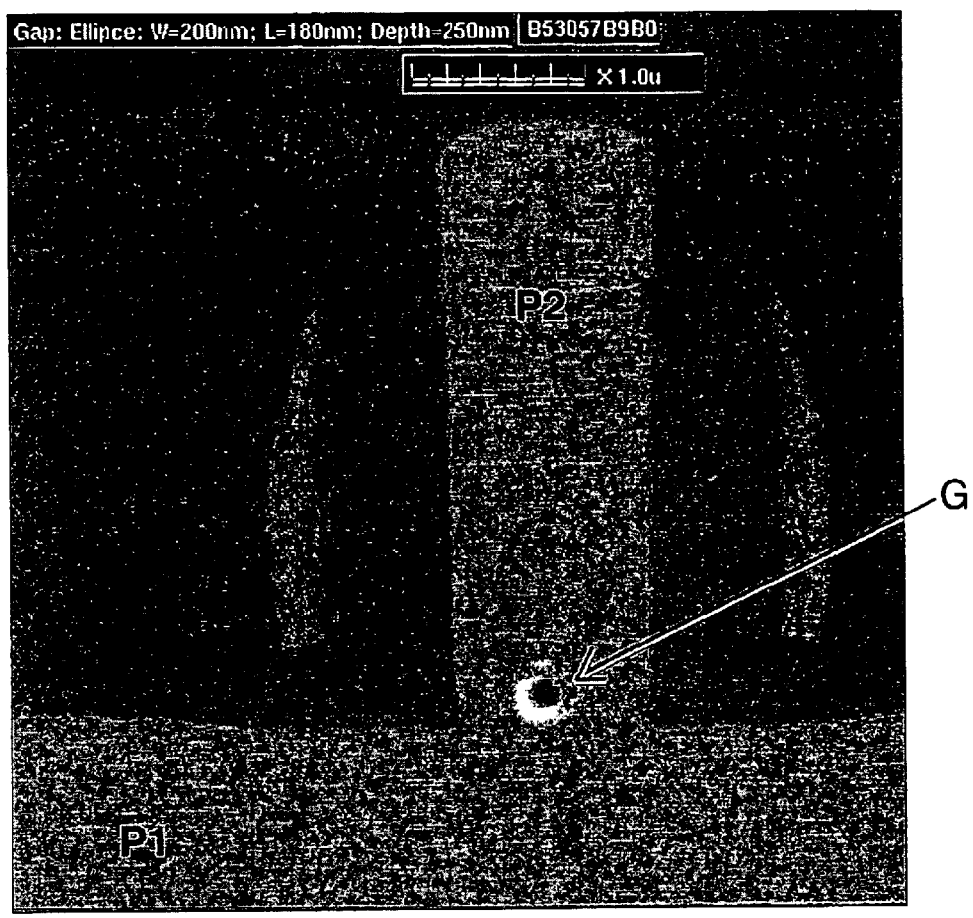
FIG. 7 is a photomicrograph of a longitudinal recording head including a gapless yoke with a flux cavity in accordance with an embodiment of the present invention.

FIG. 7 is a photomicrograph of the bottom or air bearing surface of a gapless longitudinal recording head, showing a flux cavity (depicted by the arrow G) between first and second portions P1 and P2 of the gapless recording yoke. The yoke portions P1 and P2 were made by conventional deposition techniques. The flux cavity G was made using focused ion beam direct etching as described above. The flux cavity is generally ellipsoidal in shape with a length of 180 nm measured in the along-the-track horizontal direction in FIG. 7, a width of 200 nm measured in the across-the-track horizontal direction in FIG. 7, and a depth of 250 nm measured in a vertical direction perpendicular to the air bearing surface. When ellipsoidal or other flux cavities are used in accordance with the present invention, they typically have lengths of from about 50 to about 300 nm, widths of from about 50 to about 300 nm, and depths of from about 50 to about 500 nm.

Figure 8:
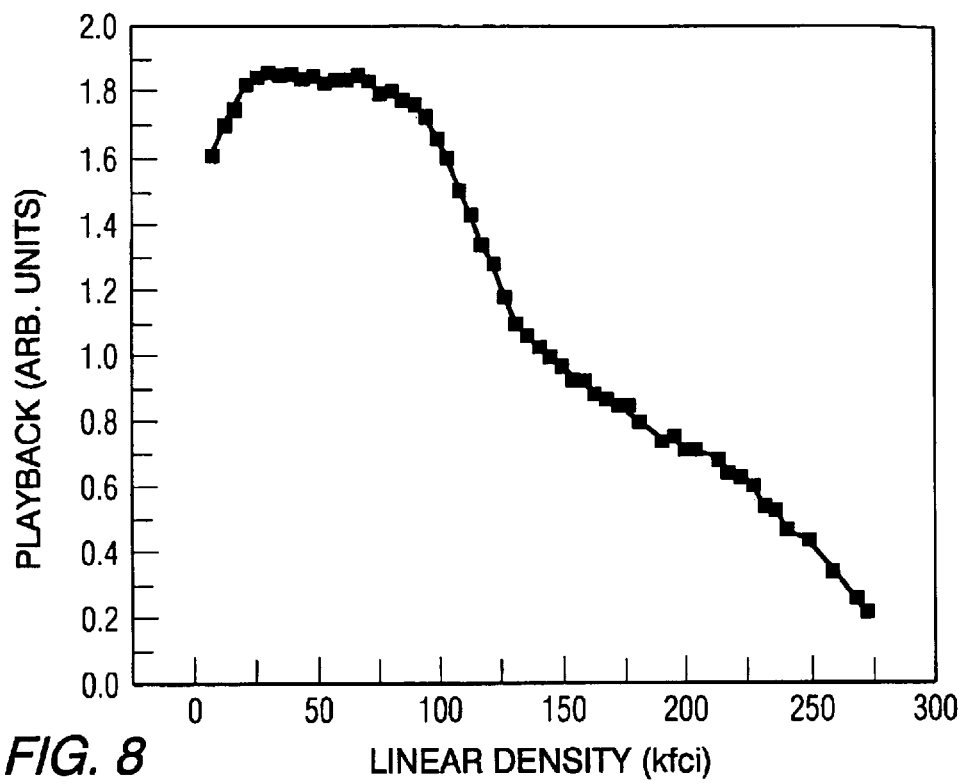
FIG. 8 is a roll-off curve for a magnetic track written by the recording head shown in FIG. 7 and read back by a conventional narrow GMR reader.

FIG. 8 is a graph of playback versus linear density, illustrating a favorable roll-off curve for a magnetic track written by the recording head shown in FIG. 7 using a write current of 50 mA. A conventional narrow GMR reader was used.

Figure 9:
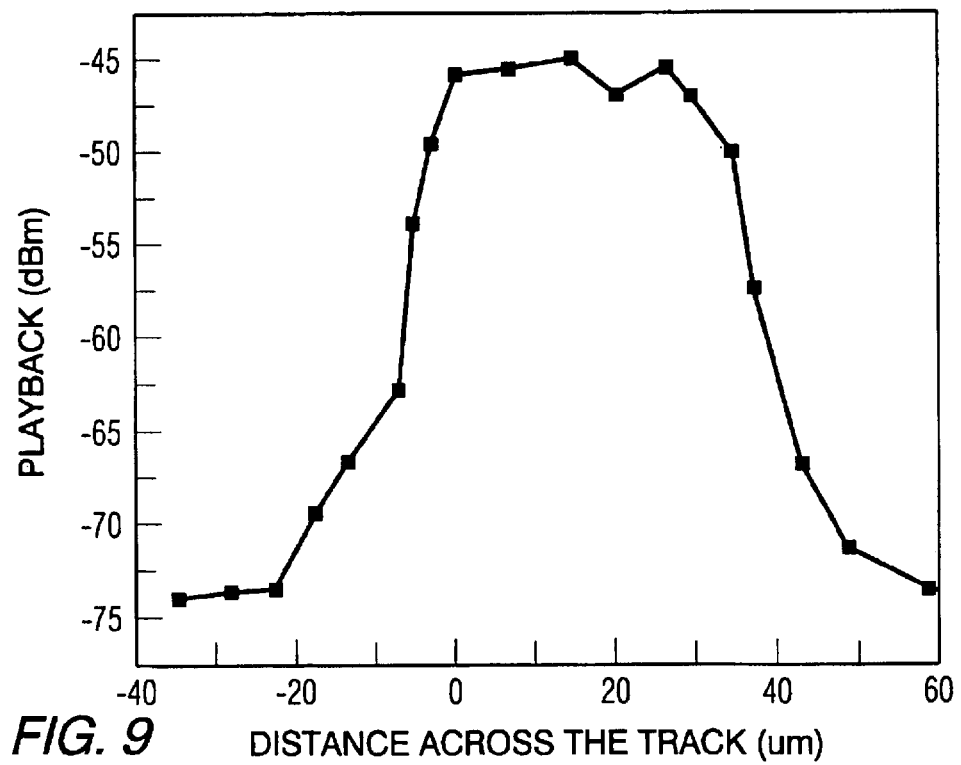
FIG. 9 is a recording track profile for a narrow track written by the recording head shown in FIG. 7 and read back by a conventional narrow GMR reader.

FIG. 9 is a graph of playback versus distance across the track, which provides a recording track profile for a narrow track written by the recording head shown in FIG. 7. The write current was 50 mA and the track speed was 32 m/s. A conventional narrow GMR reader was used.

Figure 10:
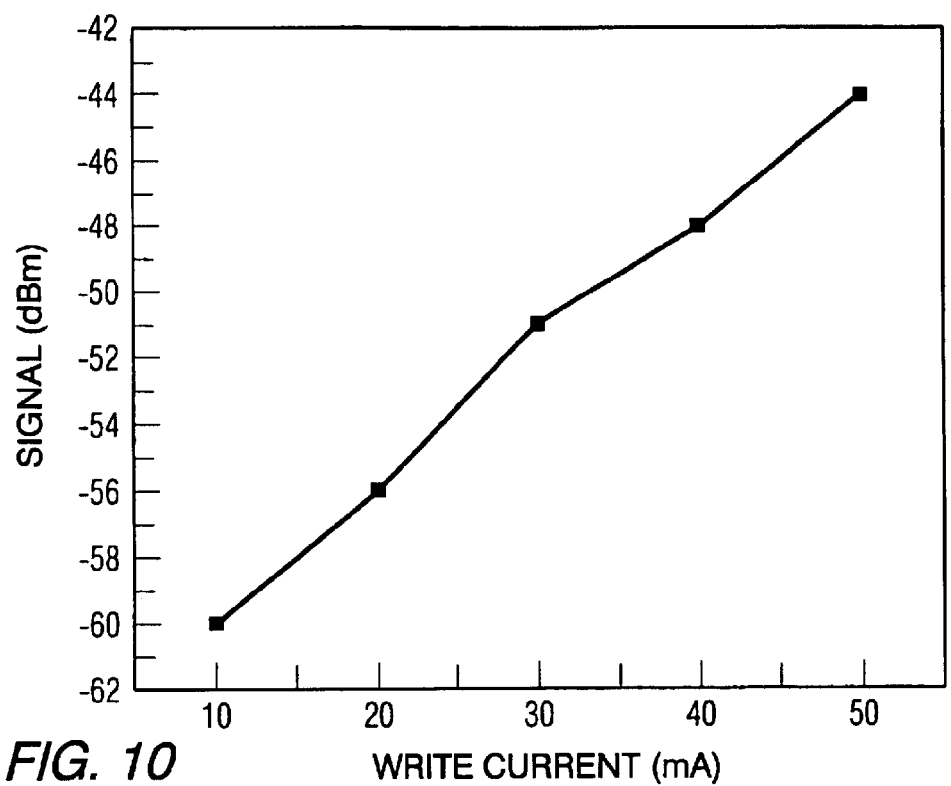
FIG. 10 is a saturation current curve, illustrating the dependence of readback signal on the amount of write current used during writing by the recording head shown in FIG. 7 and read back by a conventional narrow GMR reader.

FIG. 10 is a saturation current curve, illustrating the dependence of readback signal on the amount of write current used during writing by the recording head shown in FIG. 7 and read back by a conventional narrow GMR reader.

The use of a gapless yoke with a flux cavity provides several advantages. The present invention extends the high density potential of conventional longitudinal write head designs by forming a flux cavity in the gapless recording yoke, unlike the two-dimensional gap slits in conventional designs. The contoured cavity allows for more flexible control of the magnetic field generated by the recording head. The flux cavity geometry allows the magnetic flux to concentrate in the cavity region, thus causing relatively strong and localized fields in the disk region under the cavity. This solves the problem of conventional ring heads in which the track width is limited by the gap length. Consequently, longitudinal recording heads incorporating the present flux cavity designs can be used at densities well beyond 100 Gbit/in$^2$, while the maximum density achievable with conventional ring heads is approximately 30 Gbit/in$^2$. Another advantage of the present invention is that the longitudinal recording head is relatively easy to fabricate and does not require the introduction of new electronics. An additional benefit is that the absence of a write gap significantly increases the efficiency of the recording head because the currents necessary to saturate the yoke structure are substantially less than in a conventional head. Furthermore, processing steps required to define an ultra-thin write gap are eliminated, thereby simplifying the manufacturing process.

Whereas particular embodiments of this invention have been described above for purposes of illustration, it will be evident to those skilled in the art that numerous variations of the details of the present invention may be made without departing from the invention as defined in the appended claims.

We claim:

1. A longitudinal recording head for use with a magnetic recording medium, the longitudinal recording head comprising:

a gapless magnetic recording yoke; and means for expelling magnetic flux from a curved flux cavity defining an opening in a bottom surface of the yoke to produce a localized magnetic field in the magnetic storage medium.

2. The longitudinal recording head according to claim 1, wherein the flux cavity comprises a substantially ellipsoidal or hemispherical shape.

3. The longitudinal recording head according to claim 2, wherein the flux cavity comprises at least one inwardly curved wall.

4. The longitudinal recording head according to claim 1, wherein the flux cavity has a length of from about 50 to about 300 nm, a width of from about 50 to about 300 nm, and a depth of from about 50 to about 500 nm.

5. A longitudianl recording head for use with a magnetic recording medium, the longitudinal recording head comprising:

a gapless magnetic recording yoke; and a flux cavity defining an opening in a bottom surface of the yoke, wherein the flux cavity has a surface of varying height in a vertical direction of the yoke.

6. The longitudinal recording head according to claim 5, wherein the flux cavity is curved.

7. The longitudinal recording head according to claim 5, wherein the flux cavity comprises a substantially ellipsoidal or hemispherical shape.

8. The longitudinal recording head according to claim 7, wherein the flux cavity comprises at least one inwardly curved wall.

9. The longitudinal recording head according to claim 5, wherein the flux cavity has a length of from about 50 to about 300 nm, a width of from about 50 to about 300 nm, and a depth of from about 50 to about 500 nm.

10. A method of making a flux cavity in a magnetic recording yoke of a longitudinal recording head for use with a magnetic recording medium, the method comprising the steps of:

providing a gapless magnetic recording yoke; and creating a curved flux cavity defining an opening in a bottom surface of the yoke.

11. The method according to claim 10, wherein the step of creating a flux cavity is accomplished by removing material from the yoke.

12. The method according to claim 10, wherein the step of creating a flux cavity is accomplished using focused ion beam direct etching.

13. The method according to claim 10, wherein the flux cavity comprises a substantially ellipsoidal or hemispherical shape.

14. The method according to claim 13, wherein the flux cavity comprises at least one inwardly curved wall.

15. The method according to claim 10, wherein the flux cavity has a length of from about 50 to about 300 nm, a width of from about 50 to about 300 nm, and a depth of from about 50 to about 500 nm.

* * * * *